US011363498B2

(12) United States Patent
Qi et al.

(10) Patent No.: US 11,363,498 B2
(45) Date of Patent: Jun. 14, 2022

(54) MESH NETWORK FLOW CONTROL METHOD

(71) Applicant: Espressif Systems (Shanghai) Co., Ltd., Shanghai (CN)

(72) Inventors: Yuexia Qi, Shanghai (CN); Jiangjian Jiang, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 25 days.

(21) Appl. No.: 16/964,884

(22) PCT Filed: Jan. 8, 2019

(86) PCT No.: PCT/CN2019/070731
§ 371 (c)(1),
(2) Date: Jul. 24, 2020

(87) PCT Pub. No.: WO2019/144797
PCT Pub. Date: Aug. 1, 2019

(65) Prior Publication Data
US 2021/0037424 A1    Feb. 4, 2021

(30) Foreign Application Priority Data
Jan. 26, 2018 (CN) .......................... 201810081250.0

(51) Int. Cl.
*H04W 28/12* (2009.01)
*H04L 47/27* (2022.01)
(Continued)

(52) U.S. Cl.
CPC .............. *H04W 28/12* (2013.01); *H04L 47/27* (2013.01); *H04L 47/34* (2013.01); *H04W 84/12* (2013.01)

(58) Field of Classification Search
CPC ....... H04L 47/34; H04L 47/27; H04L 12/807; H04L 12/801; H04W 84/18; H04W 28/12; H04W 84/12
(Continued)

(56) References Cited

U.S. PATENT DOCUMENTS 7,505,450 B2 *  3/2009  Castagnoli .............. H04L 45/48
                                                          370/254
8,059,669 B2 * 11/2011  Yanagihara ........... H04L 12/185
                                                          370/408
(Continued)

FOREIGN PATENT DOCUMENTS

CN        1906898 A     1/2007
CN      101425916 A     5/2009
(Continued)

*Primary Examiner* — Man U Phan
(74) *Attorney, Agent, or Firm* — Reinhart Boerner Van Deuren P.C.

(57) ABSTRACT

A mesh network flow control method comprising: allocating a receiving window of a certain size between a parent node and each child node; the child node transmitting a window request to the parent node prior to transmitting a packet; upon receipt of the request, the parent node extracting the sequence number of the request of the child node; comparing the sequence number with a sequence number of the packet last received; calculating the size of an available window and replying to the child node with the size; and the child node transmitting the packet according to the size. Another method includes: a root node broadcasting information concerning a connection state between the root node and a server in a management frame of Wi-Fi, such that through information communication within a network, each node within the network can obtain the information, and then devices within the network transmit packets to the root node, thereby avoiding occupancy of bandwidth by unnecessary packet-transmissions.

8 Claims, 3 Drawing Sheets

(51) Int. Cl.
*H04L 47/34* (2022.01)
*H04W 84/12* (2009.01)

(58) Field of Classification Search
USPC ........................................................ 370/230
See application file for complete search history.

(56) References Cited

U.S. PATENT DOCUMENTS

| | | | | |
|---|---|---|---|---|
| 8,493,868 | B2* | 7/2013 | Nguyen | H04L 12/6418 |
| | | | | 370/236 |
| 8,599,822 | B2* | 12/2013 | Castagnoli | H04L 45/60 |
| | | | | 709/239 |
| 8,699,377 | B2* | 4/2014 | Veillette | H04L 45/42 |
| | | | | 370/254 |
| 9,338,727 | B2* | 5/2016 | Castagnoli | H04W 74/04 |
| 9,450,668 | B2* | 9/2016 | Nozaki | H04B 7/155 |
| 9,621,457 | B2* | 4/2017 | Veillette | H04L 45/52 |
| 9,628,372 | B2* | 4/2017 | Nishikata | H04W 40/34 |
| 10,757,648 | B2* | 8/2020 | Uhling | H04W 72/1289 |
| 10,763,992 | B2* | 9/2020 | Uhling | H04L 43/067 |
| 2009/0147714 | A1* | 6/2009 | Jain | H04W 52/0216 |
| | | | | 370/311 |
| 2010/0195560 | A1 | 8/2010 | Nozaki et al. | |
| 2016/0380898 | A1* | 12/2016 | Englund | H04L 47/27 |
| | | | | 370/235 |

FOREIGN PATENT DOCUMENTS

| | | |
|---|---|---|
| CN | 101631063 A | 1/2010 |
| CN | 102223734 A | 10/2011 |
| CN | 103986692 A | 8/2014 |
| CN | 104205999 A | 12/2014 |
| CN | 105101086 A | 11/2015 |
| CN | 108055679 A | 5/2018 |

* cited by examiner

MESH NETWORK FLOW CONTROL METHOD

TECHNICAL FIELD

The present invention relates to the field of wireless mesh networks, and in particular to a mesh network flow control method.

BACKGROUND ART

A wireless mesh network is a network that is completely different from a traditional wireless network. In traditional wireless access technologies, a point-to-point or point-to-multipoint topological structure is mainly employed. In such a topological structure, there often exists a center node, such as a base station in a mobile communication system, an access point (AP) in an 802.11 wireless local area network (WLAN), etc. The central node is connected to each wireless terminal through a single-hop wireless link to control the access to the wireless network from each wireless terminal; and at the same time, the central node is connected to a wired backbone network through a wired link to provide connectivity to the backbone network. However, in a wireless mesh network, a mesh topological structure is employed, which is a multipoint-to-multipoint topological structure. In such a mesh network structure, each network node is connected in a wireless multi-hop mode through other neighboring network nodes.

These network nodes form a parent-child node relationship according to the hierarchy of the network nodes in the mesh network, realizing data forwarding. As a sink of the mesh network, a root node is a node directly connected to a router and can forward data between its child nodes and the router; and the number of access devices and bandwidth of the router directly affects the throughput of the network sink device accessing an external IP network.

A leaf node only transmits data generated by itself and may not forward data from other nodes; and an intermediate node is a general term for all nodes between leaf nodes and the root node, which is able to forward data between its respective parent node and child nodes, Taking the mesh network shown in FIG. 3 as an example, the nodes C and D are intermediate nodes and are also child nodes of the root node; the nodes A and B are child nodes of the node C, and the node E is a child node of the node D; and the nodes A, B and E are leaf nodes without child nodes.

The sink throughput of the mesh network may be unstable due to other factors such as the surrounding network environment. To avoid packet loss, there is an urgent need to conduct flow control in the mesh network. Furthermore, it is also considered that there may be only one sink in the entire mesh network. For example, only the root node in the network has the ability of accessing an external server. If other nodes in the network do not know the connection state between the root node and the server, and blindly transmit data packets to the root node with the intention of forwarding the data packets to the server through the root node, at this point, it may cause loss of the data packets transmitted to the root node, or occurrence of unnecessary packet transmitting.

SUMMARY OF THE INVENTION

An objective of the present invention is to provide a mesh network flow control method, for controlling the flow of uplink transmission and determining whether to transmit a packet to a server according to the connection state between a root node and the server, in order to stabilize the sink throughput of the mesh network and avoid any packet loss or unnecessary packet transmitting.

In order to achieve the above objective, the present invention is achieved by the following technical solution:

a mesh network flow control method is proposed, in which when any node of a mesh network operates as a parent node, it allocates a receiving window for uplink data of each child node of the parent node, and dynamically maintains a size of the receiving window.

The child node transmits a window request to the parent node prior to transmitting a packet, the parent node compares a sequence number of the request in the window request corresponding to the packet to be transmitted by the child node and a sequence number of a packet last received by the parent node from the child node, and calculates the size of the receiving window and replies to the child node with a replied size of the receiving window, and the child node transmits the packet according to the replied size of the receiving window.

In the above method, a process for calculating the size of the receiving window includes the steps of:

S1) if there is no incremental relationship between the sequence number of the request and the sequence number of the packet last received, clearing the sequence number of the packet last received to zero, and then performing steps S2 or S3;

S2) when a difference between the sequence number of the request and the sequence number of the packet last received is less than or equal to a maximum size of the window:

S2.1) if "the sequence number of the packet last received+a size of the current available window+1" is greater than or equal to the sequence number of the request, using "the sequence number of the packet last received+the size of the current available window+1-the sequence number of the request" as the replied size of the receiving window; and S2.2) if "the sequence number of the packet last received+the size of the current available window+1" is less than the sequence number of the request, setting the replied size of the receiving window to zero; and S3) when the difference between the sequence number of the request and the sequence number of the packet last received is greater than the maximum size of the window, performing a virtual packet entry and exit with respect to the receiving window for a current child node to increment the sequence number of the packet last received by one, increment the sequence number of a last forwarded packet by one, and set the replied size of the receiving window to one.

Preferably, when the parent node dynamically maintains the size of the receiving window for each child node, upon receipt of the packet from the child node, the parent node decrements the size of the receiving window corresponding to the child node by one, and after forwarding the packet from the child node, the parent node increments the size of the receiving window corresponding to the child node by one.

Preferably, the parent node further allocates a receiving window corresponding to the parent node itself, and dynamically maintains the size of the receiving window:

upon generating, by the parent node itself, a packet to be transmitted to a parent node of the parent node, the parent node decrements the size of the receiving window corresponding to the parent node itself by one; and upon transmitting, by the parent node itself, the packet to the parent node of the parent node, the parent node increments the size of the receiving window corresponding to the parent node itself by one.

Preferably, the sequence number of the request corresponding to the packet to be transmitted by the child node is a sequence number set by the child node for each packet to be transmitted to its parent node, and the sequence number is valid only between the child node and its parent node; and the parent node records the sequence number of the packets received from each of its child nodes respectively, and the parent node records the sequence number of the packet forwarded for each child node.

Preferably, when the child node is a leaf node, the packet to be transmitted is a packet generated by the leaf node itself, and the leaf node sets a sequence number for the packet to be transmitted; and when the child node is an intermediate node and the packet to be transmitted is a packet generated by the intermediate node itself, the intermediate node sets a sequence number for the packet to be transmitted; or, when the packet to be transmitted is a packet received from a child node of the intermediate node and waiting to be forwarded to a parent node of the intermediate node, the intermediate node sets a sequence number for the packet to be transmitted.

Preferably, when the child node disassociates from the parent node and re-associates with the parent node from which it disassociates without takeover of the parent node between disassociating and re-associating, the sequence number set by the child node is incremented based on the sequence number when the child node disassociates; and after the parent node of the child node is taken over, the sequence number is reset starting from one.

Preferably, the parent node saves a history record for a disassociated child node, and the history record includes the sequence number of the packet last received, the sequence number of a last forwarded packet, and the number of packets retained in a current window; and the parent node provides an initialized value for a newly associated child node:

when the newly associated child node has a history record at the parent node, the initialized value includes the sequence number of the packet last received, the sequence number of the last forwarded packet, and the number of packets retained in the current window; and when the newly associated child node has no history record at the parent node, the initialized value is zero.

Preferably, the child node transmits a window request to the parent node by transmitting a flow control request packet prior to transmitting a packet; and the flow control request packet includes: a mesh packet header, a flow control request, a window size, the sequence number of the packet to be transmitted, an 802.11 frame header, and a packet body;

the parent node provides the size of the receiving window by transmitting a flow control reply packet to the child node, and the flow control reply packet comprises: a mesh packet header, a flow control reply, a replied window size, the sequence number of the packet last received, an 802.11 frame header, and a packet body.

Also proposed is a mesh network flow control method, and the method is a method in which the root node transmits information concerning the connection state between the root node itself and a server to other nodes in the mesh network through a management frame of Wi-Fi; and any one of the other nodes, when the information concerning the connection state in its received management frame indicates that the connection between the root node and the server is normal, transmits a packet to the root node through the mesh network, and the root node forwards data to the server through a router.

DETAILED DESCRIPTION OF THE PREFERRED EMBODIMENTS

Figure 1:
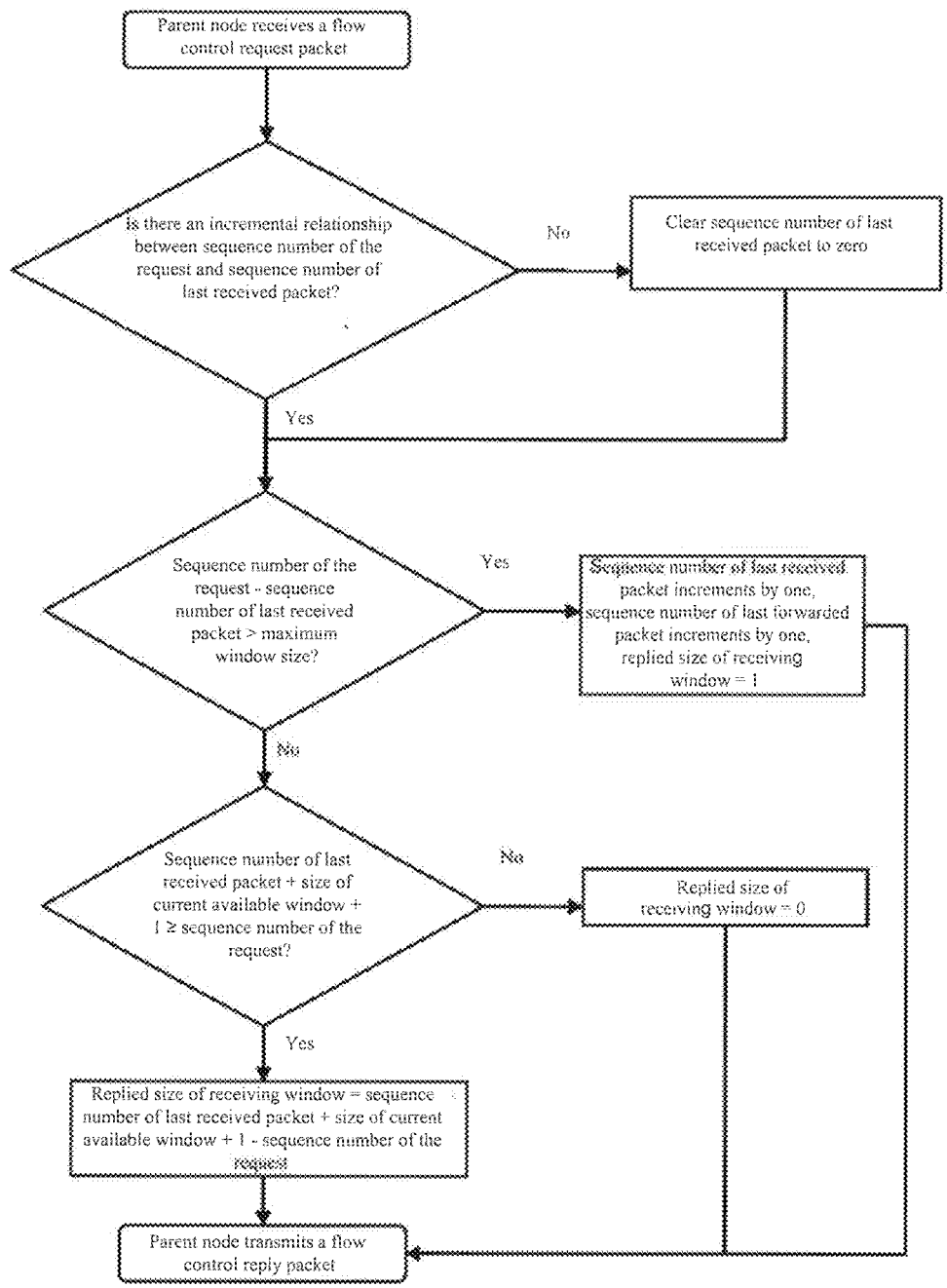
FIG. 1 is a flowchart of a flow control method.

In a mesh network flow control method provided by the present invention, the flow of uplink transmission is controlled. When any node operates as a parent node, it allocates a receiving window of a certain size (for buffering data) for each of its child nodes and the parent node itself, and dynamically maintains the size of the receiving window; and upon receipt of a packet from the child node, the parent node decrements the size of the receiving window by one, and after forwarding the packet from the child node, the parent node increments the size of the receiving window by one. When any node operates as an intermediate node, the node itself generates a packet to be transmitted to its parent node, the receiving window is decremented by one, and after transmitting a packet to its parent node, the intermediate node increments the size of the receiving window by one.

Any node sets a sequence number for each packet to be transmitted to its parent node, and the sequence number is valid only between this node and its parent node. The parent node records the sequence number of the packet received from each child node, and the parent node also records the sequence number of the packet forwarded for each child node.

Any node transmits a flow control request packet to its parent node prior to transmitting a packet, so as to transmit a window request; the parent node replies to the node with a flow control reply packet to inform the size of the receiving window. The node includes the sequence number of the packet to be transmitted, also called the sequence number of the request, in the flow control request packet as transmitted.

When the node is a leaf node, it only transmits the packet generated by itself, and sets a sequence number for the packet to be transmitted by itself to the parent node for once. When the node is an intermediate node, the node set a sequence number for the packet that is generated by itself and transmitted to the parent node; and meanwhile the node also forwards the packet from its child node, and thus is required to set again a sequence number for the packet to be transmitted to the parent node.

When any child node disassociates from the parent node and re-associates with the parent node from which it disassociates without takeover of the parent node between disassociating and re-associating, the sequence number is set as following the sequence number prior to disassociating; and after the parent node of the child node is taken over, the sequence number is renumbered.

The parent node saves a history record for a disassociated child node, the history record including the sequence number of the packet last received, the sequence number of the last forwarded packet, and the number of packets retained in the current window.

When the parent node receives a packet from the child node, if the sequence number of this packet is one, it means that the child node has taken over its parent node to others between disassociating and re-associating. If the sequence number of this packet is maintained in an incremental state based on the sequence number maintained by the parent node, it indicates that there is no takeover occurred.

If the newly associated child node has a history record, the parent node initializes one new value for the newly associated child node, the new value including the sequence number of the packet last received, the sequence number of the last forwarded packet, and the number of packets retained in the current window. If the newly associated child node has no history record, the value is initialized to zero.

As shown in the flow chart of FIG. 1, the flow control method includes the following process:

upon receipt of the flow control request packet, the parent node extracts the sequence number of the request for a packet to be transmitted by the child node, compares the sequence number of the request with the sequence number of the packet last received and calculates the size of a receiving window, and replies to the child node with a flow control reply packet;

S1) if there is no incremental relationship between the sequence number of the request and the sequence number of the packet last received, the sequence number of the packet last received is cleared to zero;

S2) when a difference between the sequence number of the request and the sequence number of the packet last received is less than or equal to a maximum size of the window: if "the sequence number of the packet last received+a size of the current available window+1" is greater than or equal to the sequence number of the request, "the sequence number of the packet last received+the size of the current available window+1−the sequence number of the request" is used as the replied size of the window; and otherwise, if the "the sequence number of the packet last received+the size of the current available window+1" is less than the sequence number of the request, the replied size of the window is zero.

S3) when the difference between the sequence number of the request and the sequence number of the packet last received is greater than the maximum size of the window: a virtual packet entry and exit with respect to the receiving window for a current node is performed for a current child node, the sequence number of the packet last received is incremented by one, the sequence number of the last forwarded packet is incremented by one, and the replied size of the window is one.

Figure 2:
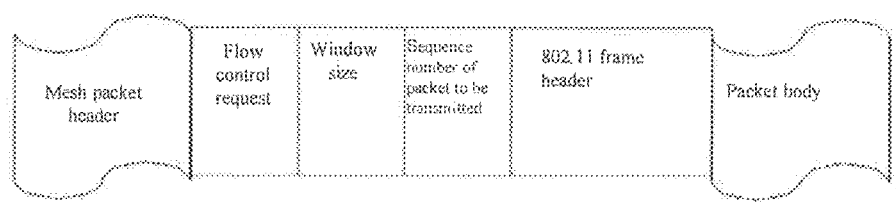
FIG. 2 shows a flow control request packet.
Figure 3:
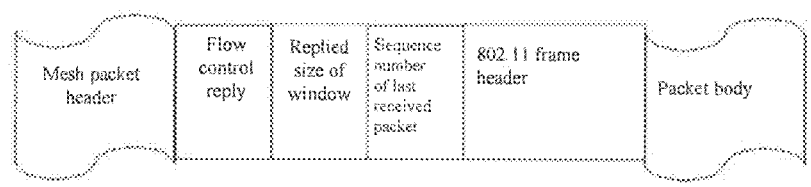
FIG. 3 shows a flow control reply packet.

In the examples as shown in FIGS. 2 and 3, the flow control request packet includes: a mesh packet header, a flow control request, a window size, the sequence number of the packet to be transmitted, an 802.11 frame header, and a packet body; and the flow control reply packet includes: a mesh packet header, a flow control reply, a replied size of the receiving window, the sequence number of the packet last received, an 802.11 frame header, and a packet body. In order to in line with the structure of the flow control reply packet, a "window size" field is set in the flow control request packet, and the field can be cleared to zero.

Figure 4:
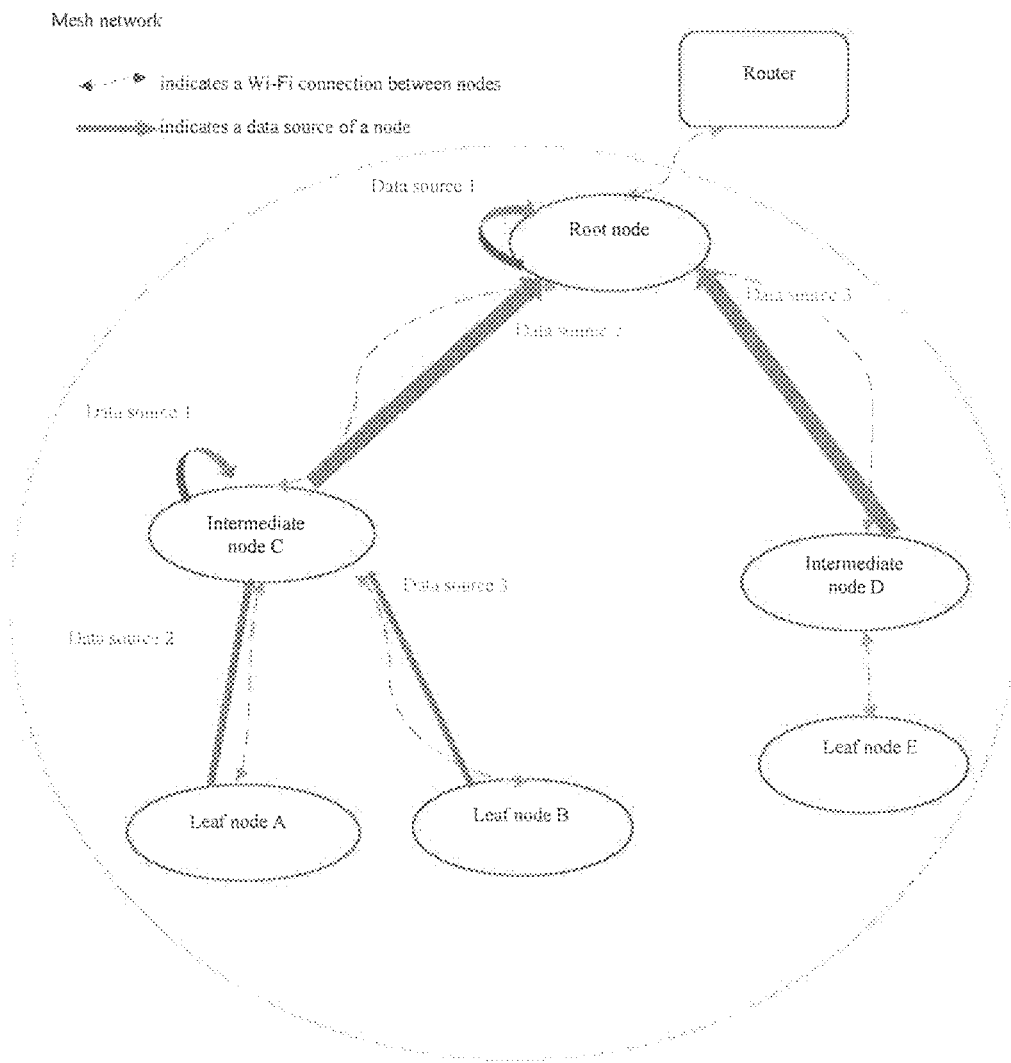
FIG. 4 shows an example of communications between nodes in a mesh network.

As shown in FIG. 4, for a root node directly connected to a router, the data source of the root node includes the uplink data generated by the root node itself and the uplink data from one or more intermediate nodes. The intermediate node is a node that forwards data from the leaf node to the root node, and the data source of the intermediate node includes the uplink data generated by the intermediate node itself and the uplink data from one or more leaf nodes. The leaf node only transmits the data generated by itself, and does not forward the data of other nodes.

Figure 5:
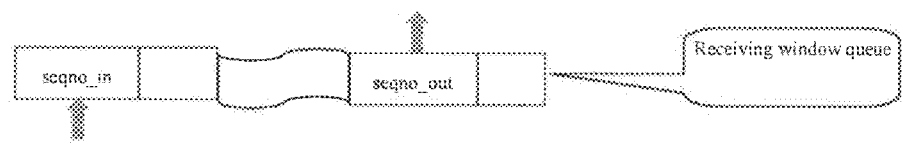
FIG. 5 is a receiving window queue.

The intermediate node maintains a structure: as shown in FIG. 5, the sequence number of the packet last received in the receiving window queue, i.e., seqno_in; the sequence number of the last forwarded packet, i.e., seqno_out, the number of packets retained in the current window, i.e., pending, and the window size, i.e., size.

Taking the intermediate node C as an example, it has a buffer queue which stores the data from the intermediate node C itself and from two child nodes A and B. The intermediate node C allocates this buffer queue to three data sources, i.e., a receiving window 1, a receiving window 2, and a receiving window 3, respectively. The receiving window 1 buffers the data from itself; the receiving window 2 buffers the data from the child node A; and the receiving window 3 buffers the data from the child node B:

receiving window 1 (seqno_in1, seqno_out1, pending1)
receiving window 2 (seqno_in2, seqno_out2, pending2)
receiving window 3 (seqno_in3, seqno_out3, pending3)

Under a normal situation in which a stable connection is maintained between the child node and the intermediate node C and there is no packet loss, seqno_in≥seqno_out, pending=seqno_in−seqno_out, and the value obtained by subtracting pending from size is the value of the size of the current available window.

Under an abnormal situation, such as a situation in which the parent node of the child node is changed frequently, or there is a packet loss between the child node and the parent node, the connection between the intermediate node C and the child node is unstable, or the child node disassociates from and then re-associates with the intermediate node C, etc., the flow control method of the present invention is illustrated through the following specific examples:

taking the receiving window 2 as an example, assuming that the sequence number of the request and the replied size of the window are X and Y, respectively;

when there is no incremental relationship between X and seqno_in2 in the history record:
  seqno_in2=0; then X−seqno_in2=X;
  if X≤size2:
  if size2−pending2+1≥X; then Y=size2−pending2+1−X;
  if size2−pending2+1<X, then Y=0;
  if X>size2, then seqno_in2=0+1, seqno_out2=seqno_out2+1, Y=1.

When there is an incremental relationship between X and seqno_in2 in the history record:
  if X−seqno_in2≤size2:
  if seqno_in2+size2−pending2+1≥X, then Y=seqno_in2+size2−pending2+1−X;
  if seqno_in2+size2−pending2+1<X then Y=0;
  if X−seqno_in2>size2:
  seqno_n2=seqno_in2+1, seqno_out2=seqno_out2+1, Y=1.

The operation when X−seqno_in>size can handle the following two scenarios:

A first scenario is where packet loss occurs between the child node and the parent node. For example, the sequence number of the request of the child node is X=1, and a window with Y=5 is replied, the parent node does not receive any of the 5 packets as transmitted, that is, the (seqno_in, seqno_out, pending) is of the parent node at this time is (0,0,0); and the next sequence number of the request of the child node is X=6, and at this point, if X−seqno_in>size, then it reaches the processing of the first scenario. By performing a virtual packet entry and exit with respect to the receiving window for the current child node, the (seqno_in, seqno_out, pending) is refreshed to (1,1,0), and then a window size is normally replied to the child node. Upon receipt of the window size, the child node transmits a packet corresponding to the sequence number of the request X=6, then the (seqno_in, seqno_out, pending) is (6,1,1), and normal processing flow will be subsequently followed.

The other scenario is where the parent node restarts. For example, after the parent node restarts, the (seqno_in, seqno_out, pending) at the parent node side is (0,0,0), then the sequence number of the request in the child node that is originally associated with the parent node is very large, even X>size; at this point, since seqno_in=0, it proceeds with the processing of this scenario when X−seqno_in>size, Similar to the above, by a virtual packet entry and exit with respect to the receiving window for the current child node, normal processing flow will be subsequently followed.

The present invention also provides a mesh network flow control method, in which the root node broadcasts information concerning the connection state between the root node itself and a server in a management frame of Wi-Fi, such as a beacon, such that through information communication in the mesh network, each node in the network may obtain this information; and after other nodes know that the connection between the root node and the server is normal (that is, the root node has the ability to forward data to the server), the other nodes then may transmit packets to the root node through information communication in the mesh network.

If, in the received management frame, the information concerning the connection state indicates that the connection between the root node and the server is abnormal, the other nodes may not directly transmit packets to the root node: for example, they may transmit packets to the root node again when the other nodes receive the management frame that is retransmitted after the connection between the root node and the server is normal, but the present invention is not limited to the processing manner in such a case.

The present invention may mix the two above described flow control methods in practical applications. For example, the root node of the first embodiment may be capable of providing information concerning the connection state in the management frame as described in the second embodiment, and one or more child nodes of the root node may determine whether to transmit a data packet to the root node according to the state. As another example, the root node of the second embodiment, when the connection between the root node and the server is limited (but not limited thereto), may also control the uplink data flow of its child nodes by replying the size of the window according to the flow control request as described in the first embodiment.

Although the disclosure of the present invention has been described in detail through the aforementioned preferred embodiments, it should be understood that the above description should not be considered as limiting the present invention. Upon reading the aforementioned content, it will be apparent to those skilled in the art that various modifications and substitutions to the present invention can be made. Thus, the claimed scope of the present invention shall be defined by the appended claims.

The invention claimed is:

1. A flow control method for a Wi-Fi mesh network comprising a plurality of nodes, wherein each node of the plurality of nodes is a Wi-Fi device, comprising the steps of:
when any node of the mesh network operates as a parent node, allocating, by the parent node, a receiving window for uplink data of each child node of the parent node, and dynamically maintaining a size of the receiving window;
transmitting, by the child node, a window request to the parent node prior to transmitting a packet;
comparing, by the parent node, a sequence number of the request in the window request corresponding to the packet to be transmitted by the child node and a sequence number of a packet last received by the parent node from the child node;
determining, by the parent node, the size of the receiving window;
replying to, by the parent node, the child node with a replied size of the receiving window; and
determining, by the child node, whether to transmit the packet according to the replied size of the receiving window;
wherein determining the size of the receiving window comprises the steps of:
S1) if there is no incremental relationship between the sequence number of the request and the sequence number of the packet last received, clearing, by the parent node, the sequence number of the packet last received to zero, and then performing, by the parent node, steps S2 or S3;
S2) when a difference between the sequence number of the request and the sequence number of the packet last received is less than or equal to a maximum size of the window is determined by the parent node;
S2.1) if "the sequence number of the packet last received+a size of the current available window+1" is greater than or equal to the sequence number of the request, using, by the parent node, "the sequence number of the packet last received+the size of the current available window+1−the sequence number of the request" as the replied size of the receiving window;
S2.2) if "the sequence number of the packet last received+the size of the current available window+1" is less than the sequence number of the request, setting, by the parent node, the replied size of the receiving window to zero; and
S3) when the difference between the sequence number of the request and the sequence number of the packet last received is greater than the maximum size of the window, performing, by the parent node, a virtual packet entry and exit with respect to the receiving window for a current child node to increment the sequence number of the packet last received by one, incrementing, by the parent node, the sequence number of a last forwarded packet by one, and setting, by the parent node, the replied size of the receiving window to one.

2. The flow control method of claim 1, further comprising:
when the parent node dynamically maintains the size of the receiving window for each child node, upon receipt of the packet from the child node, decrementing, by the parent node, the size of the receiving window corresponding to the child node by one, and after forwarding the packet from the child node, incrementing, by the parent node, the size of the receiving window corresponding to the child node by one.

3. The flow control method of claim 1, further comprising:
allocating, by the parent node, a receiving window corresponding to the parent node itself, and dynamically maintaining the size of the receiving window:
wherein upon generating, by the parent node itself, a packet to be transmitted to a parent node of the parent node, the parent node decrements the size of the receiving window corresponding to the parent node itself by one; and upon transmitting, by the parent node itself, the packet to the parent node of the parent node, the parent node increments the size of the receiving window corresponding to the parent node itself by one.

4. The flow control method of claim 1, wherein
the sequence number of the request corresponding to the packet to be transmitted by the child node is a sequence number set by the child node for each packet to be transmitted to the parent node of the child node, and the sequence number is valid only between the child node and the parent node of the child node; and
the parent node records the sequence numbers of the packets received from each of the child nodes of the parent node respectively, and the parent node records the sequence number of the packet forwarded for each child node.

5. The flow control method of claim 4, wherein
when the child node is a leaf node, the packet to be transmitted is a packet generated by the leaf node itself, and the leaf node sets a sequence number for the packet to be transmitted; and
when the child node is an intermediate node and the packet to be transmitted is a packet generated by the intermediate node itself, the intermediate node sets a sequence number for the packet to be transmitted; or, when the packet to be transmitted is a packet received from a child node of the intermediate node and waiting to be forwarded to a parent node of the intermediate node, the intermediate node sets a sequence number for the packet to be transmitted.

6. The flow control method of claim 4, wherein
when the child node disassociates from the parent node and re-associates with the parent node from which it disconnects without takeover of the parent node between disassociating and re-associating, the sequence number set by the child node is incremented based on the sequence number when the child node disassociates; and after the parent node of the child node is taken over, the sequence number is reset starting from one.

7. The flow control method of claim 5, wherein
saving, by the parent node, a history record for a disassociated child node, and wherein the history record comprises the sequence number of the packet last received, the sequence number of the last forwarded packet, and the number of packets retained in a current window; and
providing, by the parent node, an initialized value for a newly associated child node:
when the newly associated child node has a history record at the parent node, the initialized value comprises the sequence number of the packet last received, the sequence number of the last forwarded packet, and the number of packets retained in the current window; and
when the newly associated child node has no history record at the parent node, the initialized value is zero.

8. The flow control method of claim 1, wherein
transmitting, by the child node, a window request to the parent node by transmitting a flow control request packet prior to transmitting a packet; and wherein the flow control request packet comprises: a mesh packet header, a flow control request, a window size, the sequence number of the packet to be transmitted, frame header, and a packet body;
providing, by the parent node, the size of the receiving window by transmitting a flow control reply packet to the child node, and wherein the flow control reply packet comprises: a mesh packet header, a flow control reply, a replied size of the receiving window, the sequence number of the packet last received, a frame header, and a packet body.

* * * * *